US012794282B2

(12) United States Patent
Li et al.

(10) Patent No.: US 12,794,282 B2
(45) Date of Patent: Nov. 10, 2026

(54) ELECTRIC PROPULSION SYSTEM

(71) Applicant: The Boeing Company, Arlington, VA (US)

(72) Inventors: Kang Li, Winchester, MA (US); Wen Ouyang, Cary, NC (US); Daniel B. Cottrell, Centreville, VA (US); Edward C. Lovelace, Arlington, MA (US)

(73) Assignee: The Boeing Company, Arlington, VA (US)

( * ) Notice: Subject to any disclaimer, the term of this patent is extended or adjusted under 35 U.S.C. 154(b) by 230 days.

(21) Appl. No.: 18/190,782

(22) Filed: Mar. 27, 2023

(65) Prior Publication Data

US 2024/0333049 A1 Oct. 3, 2024

(51) Int. Cl.

*H02K 1/27* (2022.01)
*B64D 27/24* (2006.01)

(Continued)

(52) U.S. Cl.

CPC ............... *H02K 1/16* (2013.01); *B64D 27/24* (2013.01); *H02K 1/28* (2013.01); *H02K 11/225* (2016.01); *H02K 2201/15* (2013.01)

(58) Field of Classification Search

CPC .......... H02K 1/16; H02K 1/28; H02K 11/225; H02K 2201/15; H02K 2201/06;

(Continued)

(56) References Cited

U.S. PATENT DOCUMENTS 4,642,502 A * 2/1987 Carpenter ............ H02K 1/2781 310/216.013
6,628,034 B2 * 9/2003 Jang ....................... H02K 21/16 310/179

(Continued)

FOREIGN PATENT DOCUMENTS

CN 105871267 A * 8/2016
DE 102014019217 A1 * 6/2016 ........... H02K 1/2766

(Continued)

OTHER PUBLICATIONS

Extended European Search Report prepared by the European Patent Office in application No. EP 24 15 3739.8 dated Jul. 24, 2024.

(Continued)

*Primary Examiner* — Thomas Truong
(74) *Attorney, Agent, or Firm* — Hanley, Flight & Zimmerman, LLC

(57) ABSTRACT

An electric propulsion system includes a first stator segment including first teeth and first coils wound around the first teeth and a second stator segment including second teeth and second coils wound around the second teeth. A gap exists in an azimuthal direction between the first stator segment and the second stator segment. The electric propulsion system also includes a rotor frame and rotor magnets. The rotor magnets are attached to the rotor frame and configured to rotate the rotor frame in the azimuthal direction in response to the first coils or the second coils being provided current. The electric propulsion system also includes a propeller including a first blade attached to the rotor frame at a first (Continued)

distal end of the first blade and a second blade attached to the rotor frame at a second distal end of the second blade.

21 Claims, 11 Drawing Sheets

(51) Int. Cl.

| | |
|---|---|
| ***H02K 1/16*** | (2006.01) |
| ***H02K 1/28*** | (2006.01) |
| ***H02K 11/225*** | (2016.01) |

(58) Field of Classification Search

CPC ...... H02K 2213/12; H02K 1/278; H02K 7/14; H02K 9/06; H02K 1/148; H02K 1/30; H02K 3/28; H02K 3/522; B64D 27/24; B64D 27/30; B64D 27/34; B64D 27/40; B64D 33/08; B64U 50/19; B64C 11/001

See application file for complete search history.

(56) References Cited

U.S. PATENT DOCUMENTS

| | | | | |
|---|---|---|---|---|
| 8,922,087 | B1 * | 12/2014 | Rittenhouse | H02K 29/03 310/156.01 |
| 11,804,759 | B1 * | 10/2023 | Widdis | H02K 1/278 |
| 2009/0224621 | A1 * | 9/2009 | Okubo | H02K 1/278 310/156.25 |
| 2012/0098382 | A1 | 4/2012 | Lau et al. | |
| 2013/0278087 | A1 * | 10/2013 | Kimiabeigi | H02K 1/2791 310/51 |
| 2015/0015107 | A1 * | 1/2015 | Blum | H02K 1/276 310/156.25 |
| 2017/0104385 | A1 * | 4/2017 | Salamon | B64C 11/12 |
| 2018/0219434 | A1 | 8/2018 | Patterson et al. | |
| 2018/0287459 | A1 | 10/2018 | Huang et al. | |
| 2022/0399848 | A1 * | 12/2022 | Coldwate | H02P 27/04 |

FOREIGN PATENT DOCUMENTS

| | | |
|---|---|---|
| EP | 1 647 081 | 4/2006 |
| EP | 3 968 503 A1 | 3/2022 |
| EP | 4 037 167 A1 | 8/2022 |

OTHER PUBLICATIONS

European Patent Office, "Communication Pursuant to Article 94(3) EPC," issued in connection with European Patent Application No. 24153739.8, dated Jun. 29, 2026, 9 pages.

* cited by examiner

ELECTRIC PROPULSION SYSTEM

FIELD

The present disclosure generally relates to an electric propulsion system, and more specifically to an electric propulsion system that includes multiple stator segments.

BACKGROUND

Some motor designs generate large amounts of heat during operation and thus a fluid cooling system can be used to prevent damage to the motor's permanent magnets, insulation, and bearings. However, for weight-sensitive applications such as small aircraft, the large weight of the fluid cooling system is undesirable, making air cooling systems more practical. A disadvantage is that air cooling systems generally do not remove heat from the motor as quickly as fluid based cooling systems and, thus, such propulsion systems generally have lower maximum power ratings so that heat generation does not overwhelm the air cooling system. Accordingly, a need exists for an electric propulsion system that can be more effectively cooled with an air cooling system.

SUMMARY

One aspect of the disclosure is an electric propulsion system comprising: a first stator segment comprising first teeth and first coils wound around the first teeth; a second stator segment comprising second teeth and second coils wound around the second teeth, wherein a gap exists in an azimuthal direction between the first stator segment and the second stator segment; a rotor frame; rotor magnets attached to the rotor frame and configured to rotate the rotor frame in the azimuthal direction in response to the first coils or the second coils being provided current; and a propeller comprising a first blade attached to the rotor frame at a first distal end of the first blade and a second blade attached to the rotor frame at a second distal end of the second blade.

Another aspect of the disclosure is a method of operating an electric propulsion system, the method comprising: providing a first current to first coils that are wound around first teeth of a first stator segment and providing a second current that is out of phase with the first current to second coils that are wound around second teeth of a second stator segment, thereby causing rotor magnets attached to a rotor frame to rotate the rotor frame and a propeller in an azimuthal direction, the propeller comprising a first blade attached to the rotor frame at a first distal end of the first blade and a second blade attached to the rotor frame at a second distal end of the second blade, wherein a gap exists in the azimuthal direction between the first stator segment and the second stator segment.

Another aspect of the disclosure is an aircraft comprising: a body; and an electric propulsion system configured to propel the body, the electric propulsion system comprising: a first stator segment comprising first teeth and first coils wound around the first teeth; a second stator segment comprising second teeth and second coils wound around the second teeth, wherein a gap exists in an azimuthal direction between the first stator segment and the second stator segment; a rotor frame; rotor magnets attached to the rotor frame and configured to rotate the rotor frame in the azimuthal direction in response to the first coils or the second coils being provided current; and a propeller comprising a first blade attached to the rotor frame at a first distal end of the first blade and a second blade attached to the rotor frame at a second distal end of the second blade.

By the term "about" or "substantially" with reference to amounts or measurement values described herein, it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

The features, functions, and advantages that have been discussed can be achieved independently in various examples or may be combined in yet other examples further details of which can be seen with reference to the following description and drawings.

BRIEF DESCRIPTION OF THE DRAWINGS

The novel features believed characteristic of the illustrative examples are set forth in the appended claims. The illustrative examples, however, as well as a preferred mode of use, further objectives and descriptions thereof, will best be understood by reference to the following detailed description of an illustrative example of the present disclosure when read in conjunction with the accompanying Figures.

DETAILED DESCRIPTION

As noted above, a need exists for an electric propulsion system that can be more effectively cooled with an air cooling system. Accordingly, this disclosure includes an electric propulsion system that includes a first stator segment including first teeth and first coils wound around the first teeth and a second stator segment including second teeth and second coils wound around the second teeth. A gap exists in an azimuthal direction between the first stator segment and the second stator segment. The electric propulsion system also includes a rotor frame and rotor magnets. The rotor magnets are attached to the rotor frame and configured to rotate the rotor frame in the azimuthal direction in response to the first coils or the second coils being provided current. The electric propulsion system also includes a propeller including a first blade attached to the rotor frame at a first distal end of the first blade and a second blade attached to the rotor frame at a second distal end of the second blade.

Heat densities generated by the electric propulsion system and the total mass of the electric propulsion system are generally reduced when compared to a similar system that uses a stator that forms a full circle without one or more gaps between multiple stator segments. The dimensions of the rotor magnets, the teeth, and the coils can also be increased in the axial direction to enhance torque generation with a minimal increase in weight.

Disclosed examples will now be described more fully hereinafter with reference to the accompanying Drawings, in which some, but not all of the disclosed examples are shown. Indeed, several different examples may be described and should not be construed as limited to the examples set forth herein. Rather, these examples are described so that this disclosure will be thorough and complete and will fully convey the scope of the disclosure to those skilled in the art.

Figure 1:
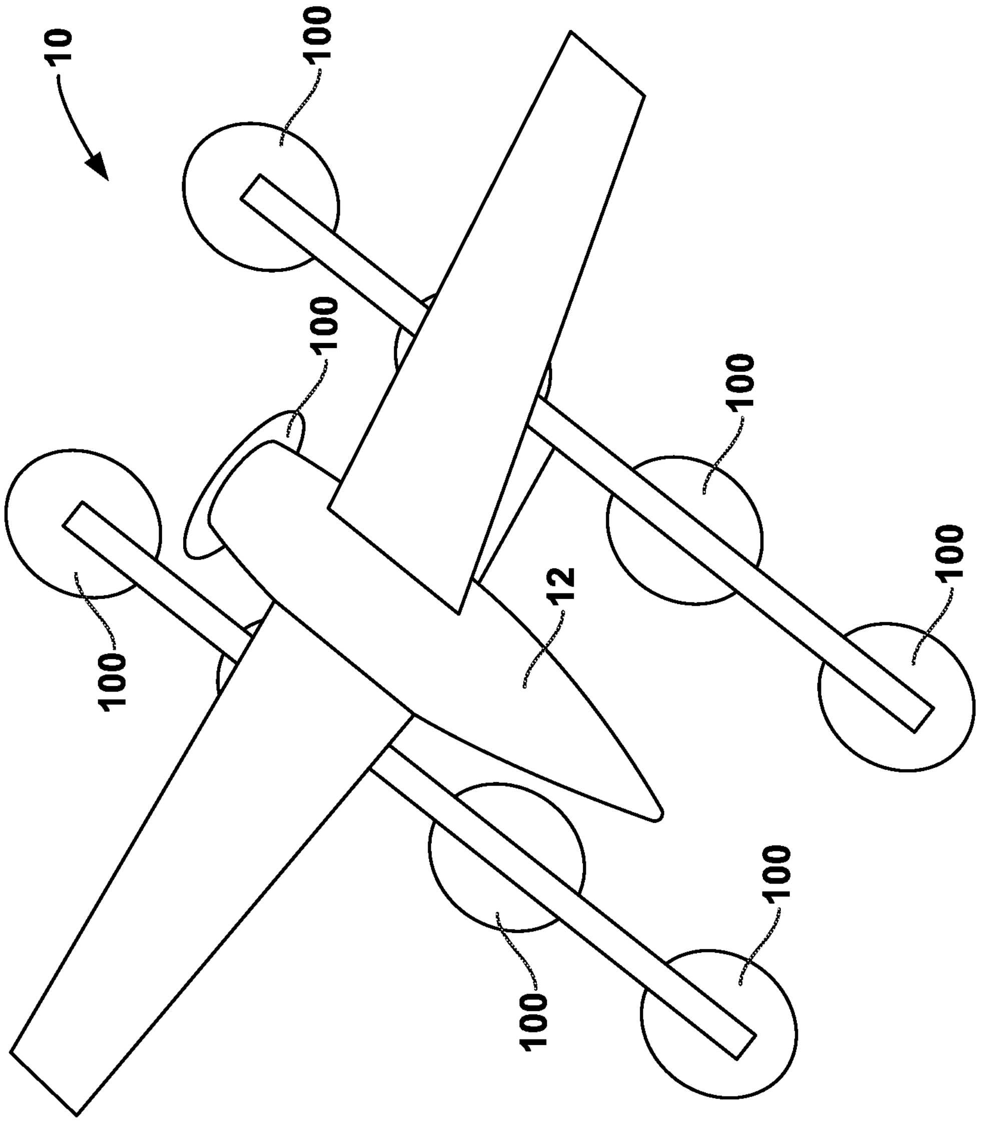
FIG. 1 is a schematic diagram of an aircraft, according to an example.

FIG. 1 is an example schematic view of an aircraft 10, according to an example. The aircraft 10 may be or include a fixed wing aircraft, a helicopter, a rotorcraft, an unmanned aerial vehicle (e.g., a drone), and the like. The aircraft 10 includes a body 12 (e.g., a fuselage). The aircraft 10 includes one or more electric propulsion systems 100, which are described in more detail below.

Figure 2:
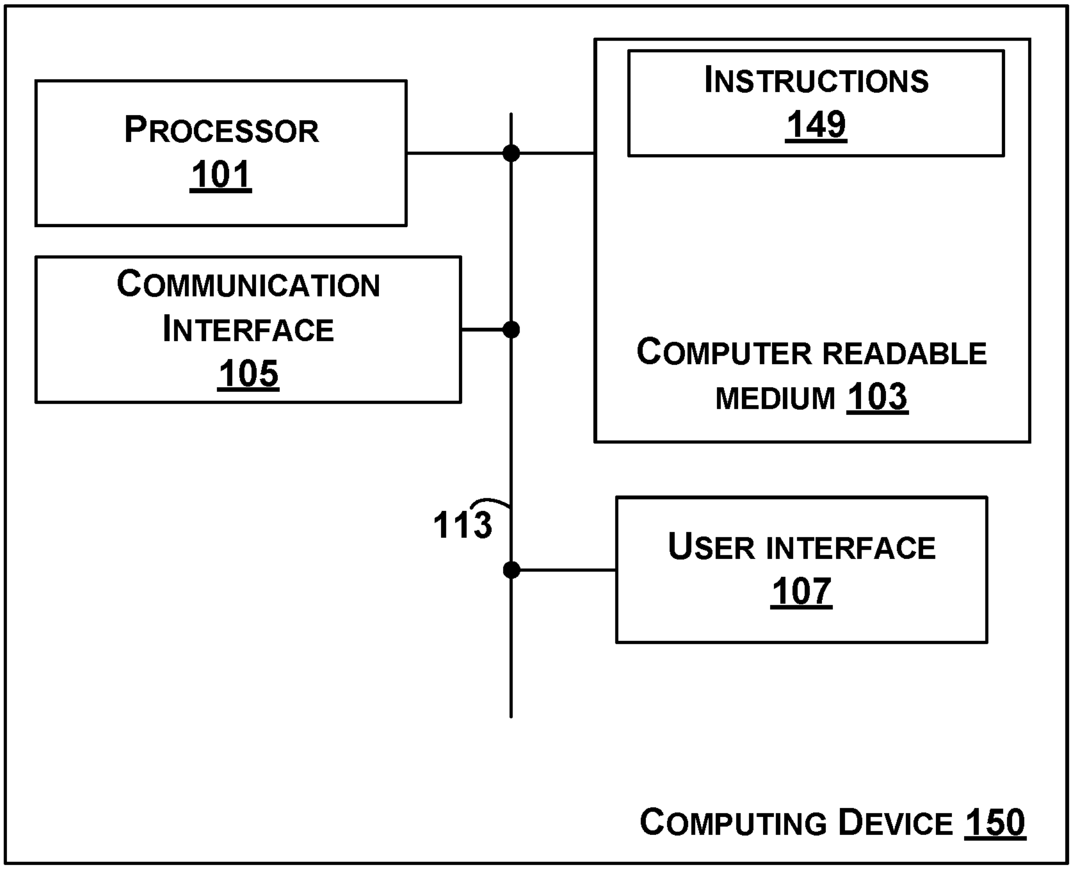
FIG. 2 is a block diagram of a computing device, according to an example.

FIG. 2 is a block diagram of a computing device 150. The computing device 150 includes one or more processors 101, a non-transitory computer readable medium 103, a communication interface 105, and a user interface 107. Components of the computing device 150 are linked together by a system bus, network, or other connection mechanism 113.

The one or more processors 101 can be any type of processor(s), such as a microprocessor, a field programmable gate array, a digital signal processor, a multicore processor, etc., coupled to the non-transitory computer readable medium 103.

The non-transitory computer readable medium 103 can be any type of memory, such as volatile memory like random access memory (RAM), dynamic random access memory (DRAM), static random access memory (SRAM), or non-volatile memory like read-only memory (ROM), flash memory, magnetic or optical disks, or compact-disc read-only memory (CD-ROM), among other devices used to store data or programs on a temporary or permanent basis.

Additionally, the non-transitory computer readable medium 103 can store instructions 149. The instructions 149 are executable by the one or more processors 101 to cause the computing device 150 to perform any of the functions or methods described herein.

The communication interface 105 can include hardware to enable communication within the computing device 150 and/or between the computing device 150 and one or more other devices. The hardware can include any type of input and/or output interfaces, a universal serial bus (USB), PCI Express, transmitters, receivers, and antennas, for example. The communication interface 105 can be configured to facilitate communication with one or more other devices, in accordance with one or more wired or wireless communication protocols. For example, the communication interface 105 can be configured to facilitate wireless data communication for the computing device 150 according to one or more wireless communication standards, such as one or more Institute of Electrical and Electronics Engineers (IEEE) 801.11 standards, ZigBee standards, Bluetooth standards, etc. As another example, the communication interface 105 can be configured to facilitate wired data communication with one or more other devices. The communication interface 105 can also include analog-to-digital converters (ADCs) or digital-to-analog converters (DACs) that the computing device 150 can use to control various components of the computing device 150 or external devices.

The user interface 107 can include any type of display component configured to display data. As one example, the user interface 107 can include a touchscreen display. As another example, the user interface 107 can include a flat-panel display, such as a liquid-crystal display (LCD) or a light-emitting diode (LED) display. The user interface 107 can include one or more pieces of hardware used to provide data and control signals to the computing device 150. For instance, the user interface 107 can include a mouse or a pointing device, a keyboard or a keypad, a microphone, a touchpad, or a touchscreen, among other possible types of user input devices. Generally, the user interface 107 can enable an operator to interact with a graphical user interface (GUI) provided by the computing device 150 (e.g., displayed by the user interface 107).

Figure 3:
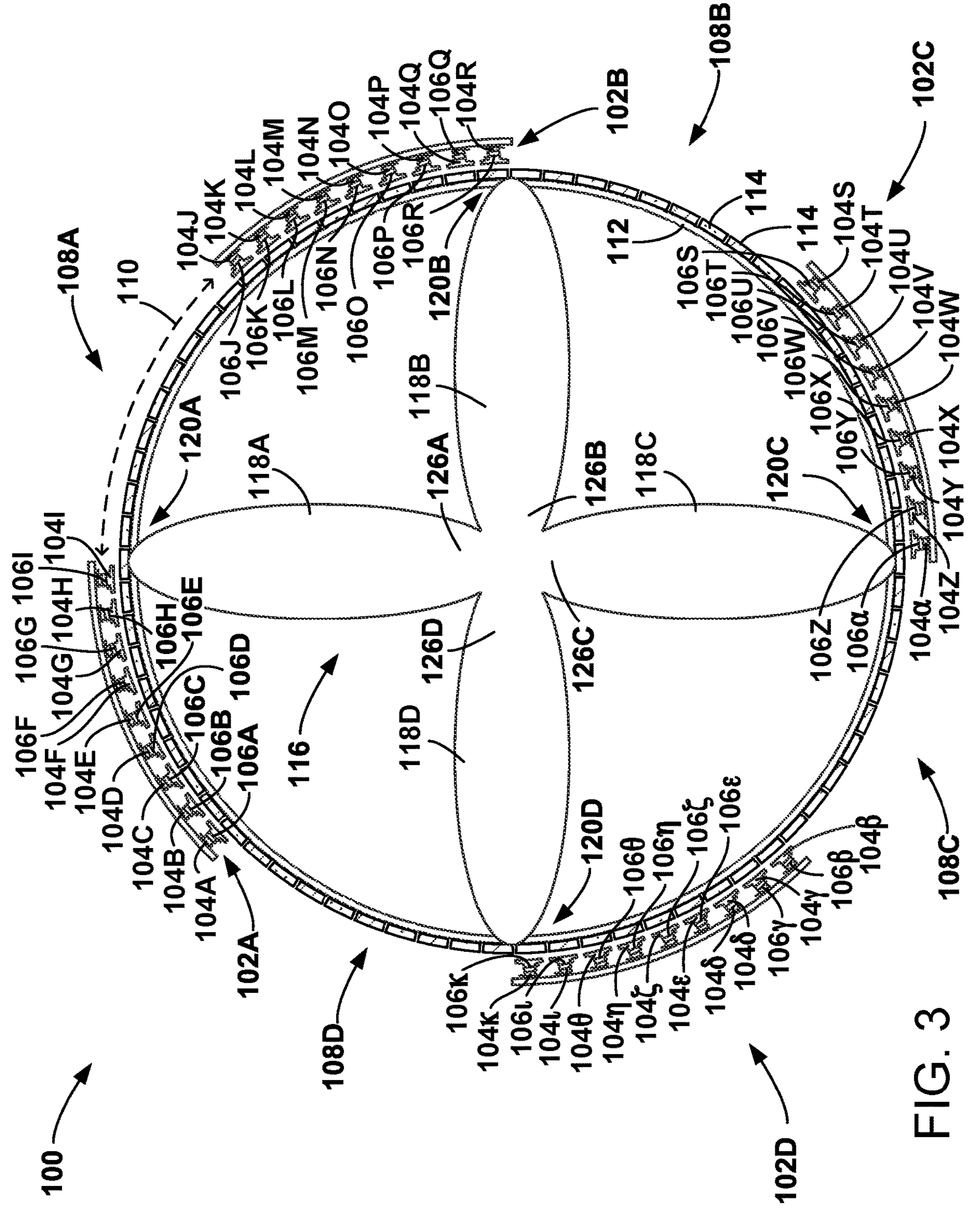
FIG. 3 is a schematic diagram of an electric propulsion system, according to an example.

FIG. 3 is a schematic diagram of an electric propulsion system 100. The electric propulsion system 100 includes a stator segment 102A that includes teeth 104A, 104B, 104C, 104D, 104E, 104F, 104G, 104H, and 104I. The stator segment 102A also includes coils 106A, 106B, 106C, 106D, 106E, 106F, 106G, 106H, 106I wound respectively around the teeth 104A-I.

The electric propulsion system 100 also includes a stator segment 102B that includes teeth 104J, 104K, 104L, 104M, 104N, 104O, 104P, 104Q, and 104R. The stator segment 102B also includes coils 106J, 106K, 106L, 106M, 106N, 106O, 106P, 106Q, and 106R wound respectively around the teeth 104J-R. A gap 108A exists in an azimuthal direction 110 between the stator segment 102A and the stator segment 102B.

The electric propulsion system 100 also includes a stator segment 102C that includes teeth 104S, 104T, 104U, 104V, 104W, 104X, 104Y, 104Z, and 104α. The stator segment 102C also includes coils 106S, 106T, 106U, 106V, 106W, 106X, 106Y, 106Z, and 106α wound respectively around the teeth 104S-α. A gap 108B exists in the azimuthal direction 110 between the stator segment 102B and the stator segment 102C.

The electric propulsion system 100 also includes a stator segment 102D that includes teeth 104β, 104γ, 104δ, 104ε, 104ζ, 104η, 104θ, 104ι, and 104κ. The stator segment 102D also includes coils 106β, 106γ, 106δ, 106ε, 106ζ, 106η, 106θ, 106ι, and 106κ wound respectively around the teeth 104β-κ. A gap 108C exists in the azimuthal direction 110 between the stator segment 102C and the stator segment 102D. A gap 108D also exists in the azimuthal direction 110 between the stator segment 102D and the stator segment 102A.

Generally, the electric propulsion system 100 can include any number of stator segments 102 with corresponding teeth 104, coils 106, and gaps 108. The stator segments 102A-D are coplanar as shown in FIG. 3.

The teeth 104 are generally formed of a ferromagnetic material and have a spool-like structure suitable for the coils 106 to be wound around.

The coils 106 take the form of insulated conductive (e.g., copper) wire wrapped around respective teeth 104. When electric current is passed through a coil 106, the coil 106 and the corresponding tooth 104 can act as an electromagnet that applies an attractive or repulsive force to rotor magnets 114 (depending on the polarity of the rotor magnets 114 facing the coil 106).

The electric propulsion system 100 also includes a rotor frame 112 and the rotor magnets 114 attached to the rotor frame 112. The rotor magnets 114 are configured to rotate the rotor frame 112 in the azimuthal direction 110 in response to the coils 106A-κ being provided electrical current.

The rotor frame 112 generally takes the form of a non-magnetic (e.g., aluminum) tube. In FIG. 3, the rotor magnets 114 are permanent magnets that are affixed to an outer perimeter of the rotor frame 112. As shown, the rotor frame 112 is proximal with respect to the stator segments 102A-D. The rotor magnets 114 are typically arranged such that rotor magnets 114 having a north pole facing the stator segments 102 are alternatingly interspersed with rotor magnets 114 having a south pole facing the stator segments 102, but other examples are possible.

In other examples discussed below, the rotor frame 112 is distal with respect to the stator segments 102A-D. In such examples, the rotor magnets 114 can be affixed to an inner perimeter of the rotor frame 112 to face and interact with the stator segments 102A-D.

The electric propulsion system 100 also includes a propeller 116 that includes a blade 118A attached (e.g., welded or fastened) to the rotor frame 112 at a distal end 120A of the blade 118A, a blade 118B attached (e.g., welded or fastened) to the rotor frame 112 at a distal end 120B of the blade 118B, a blade 118C attached (e.g., welded or fastened) to the rotor frame 112 at a distal end 120C of the blade 118C, and a blade 118D attached (e.g., welded or fastened) to the rotor frame 112 at a distal end 120D of the blade 118D. The propeller 116 is generally formed of a non-magnetic metal such as aluminum or a composite structure such as fiberglass. The blade 118A includes a proximal end 126A, the blade 118B includes a proximal end 126B, the blade 118C includes a proximal end 126C, and the blade 118D includes a proximal end 126D. The proximal ends 126A-D are all attached to each other.

In one example, the coils 106A-C, the coils 106J-L, the coils 106S-U, and the coils 106β-δ are all wired in series to form a first phase of the electric propulsion system 100. Similarly, the coils 106D-F, the coils 106M-O, the coils 106V-X, and the coils 106ε-η are all wired in series to form a second phase of the electric propulsion system 100. Similarly, the coils 106G-I, the coils 106P-R, the coils 106Y-α, and the coils 106θ-κ are all wired in series to form a third phase of the electric propulsion system 100. In this example, the three phases are connected to each other at a neutral or ground terminal.

Thus, the computing device 150 or a manual process provides a first current to the coils 106A-C, the coils 106J-L, the coils 106S-U, and the coils 106β-δ, provides a second current that is out of phase with the first current to the coils 106D-F, the coils 106M-O, the coils 106V-X, and the coils 106ε-η, and provides a third current that is out of phase with the first current and the second current to the coils 106G-I, the coils 106P-R, the coils 106Y-α, and the coils 106θ-κ, thereby causing the rotor magnets 114 attached to a rotor frame 112 to rotate the rotor frame 112 and the propeller 116 in the azimuthal direction 110.

In some examples, the computing device 150 detects a fault within the coils 106A-C, the coils 106J-L, the coils 106S-U, or the coils 106β-δ and adjusts the second current provided to the coils 106D-F, the coils 106M-O, the coils 106V-X, and the coils 106ε-η in response to detecting the fault. For example, the computing device 150 can detect an open circuit fault within one more of the coils 106A-C, the coils 106J-L, the coils 106S-U, or the coils 106β-δ and responsively increase the second current provided to the coils 106D-F, the coils 106M-O, the coils 106V-X, and the coils 106ε-η.

Figure 4:
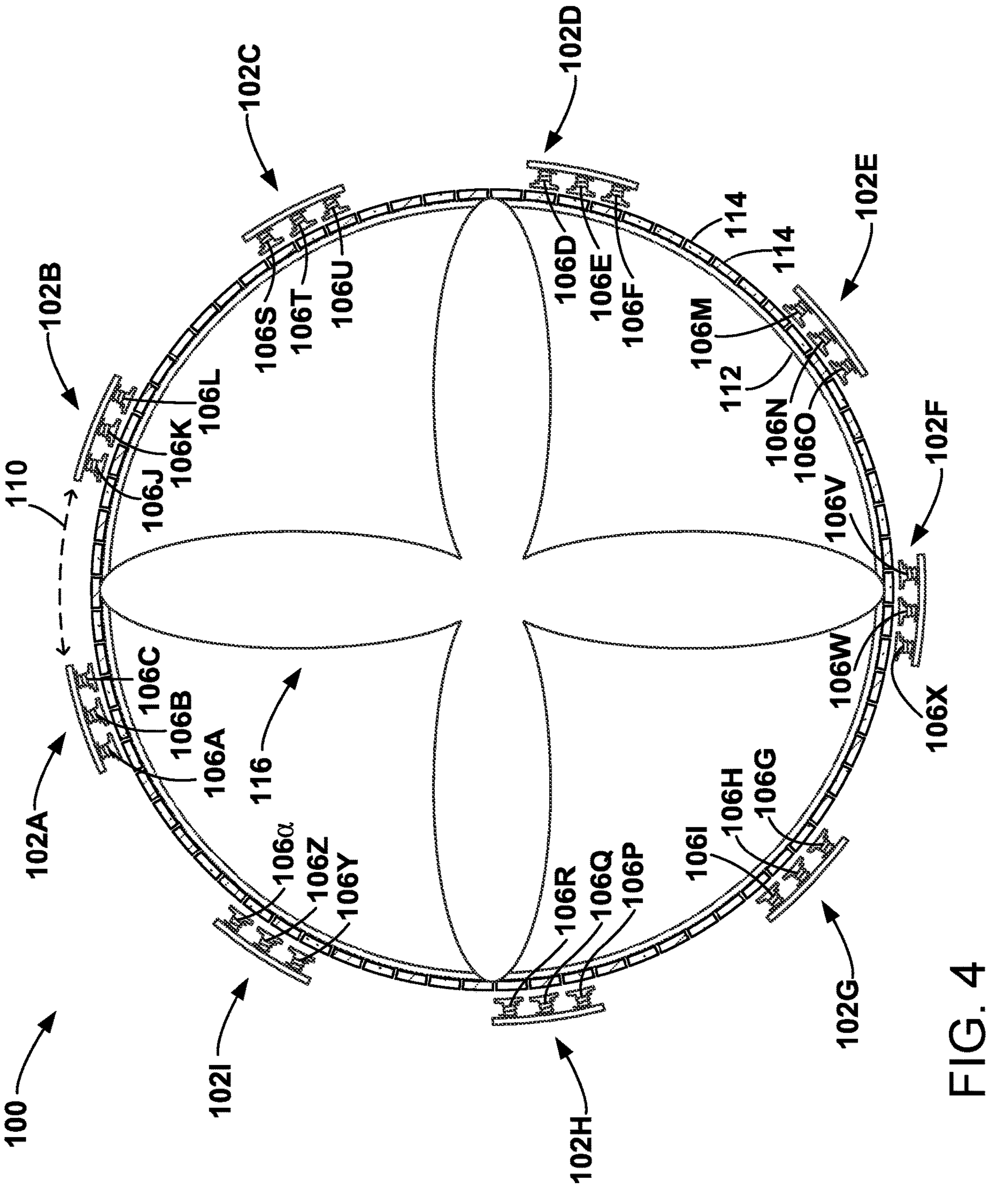
FIG. 4 is a schematic diagram of an electric propulsion system, according to an example.

FIG. 4 is a schematic diagram of another example of the electric propulsion system 100. In FIG. 4, the electric propulsion system 100 includes all of the structures and features of the electric propulsion system 100 shown in FIG. 3, unless context clearly dictates otherwise.

In some examples, the coils 106A-C of the stator segment 102A, the coils 106D-F of the stator segment 102D, and the coils 106G-I of the stator segment 102G are in series with each other as a first phase of the electric propulsion system 100. The coils 106J-L of stator segment 102B, the coils 106M-O of the stator segment 102E, and the coils 106P-R of the stator segment 102H are in series with each other as a second phase of the electric propulsion system 100. The coils 106S-U of stator segment 102C, the coils 106V-X of the stator segment 102F, and the coils 106Y-α of the stator segment 1021 are in series with each other as a third phase of the electric propulsion system 100. In this example, the three phases are connected to each other at a neutral or ground terminal.

Thus, the computing device 150 or a manual process provides a first current to the coils 106A-I, provides a second current that is out of phase with the first current to the coils 106J-R, and provides a third current that is out of phase with the first current and the second current to the coils 106S-α, thereby causing the rotor magnets 114 attached to a rotor frame 112 to rotate the rotor frame 112 and the propeller 116 in the azimuthal direction 110.

In some examples, the computing device 150 detects a fault within one or more of the coils 106A-I and adjusts the second current provided to t the coils 106J-R in response to detecting the fault. For example, the computing device 150 can detect an open circuit fault within one more of the coils 106A-I and responsively increase the second current provided to the coils 106J-R.

Figure 5:
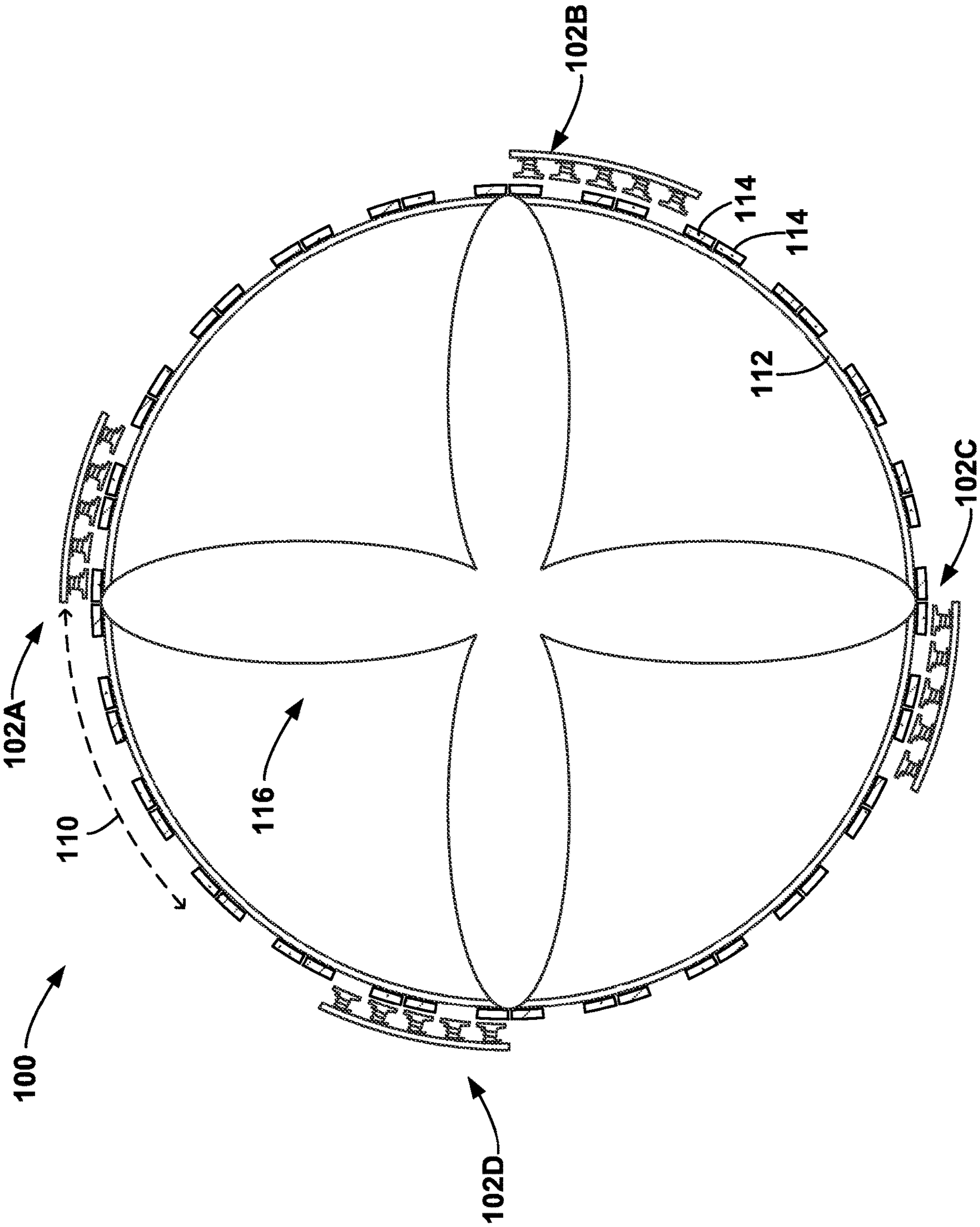
FIG. 5 is a schematic diagram of an electric propulsion system, according to an example.

FIG. 5 is a schematic diagram of another example of the electric propulsion system 100. In FIG. 5, the electric propulsion system 100 includes all of the structures and features of the electric propulsion systems 100 shown in FIG. 3 and FIG. 4, unless context clearly dictates otherwise.

The electric propulsion system 100 in FIG. 5 includes rotor magnets 114 that are grouped in pairs with pronounced spaces between the pairs.

Figure 6:
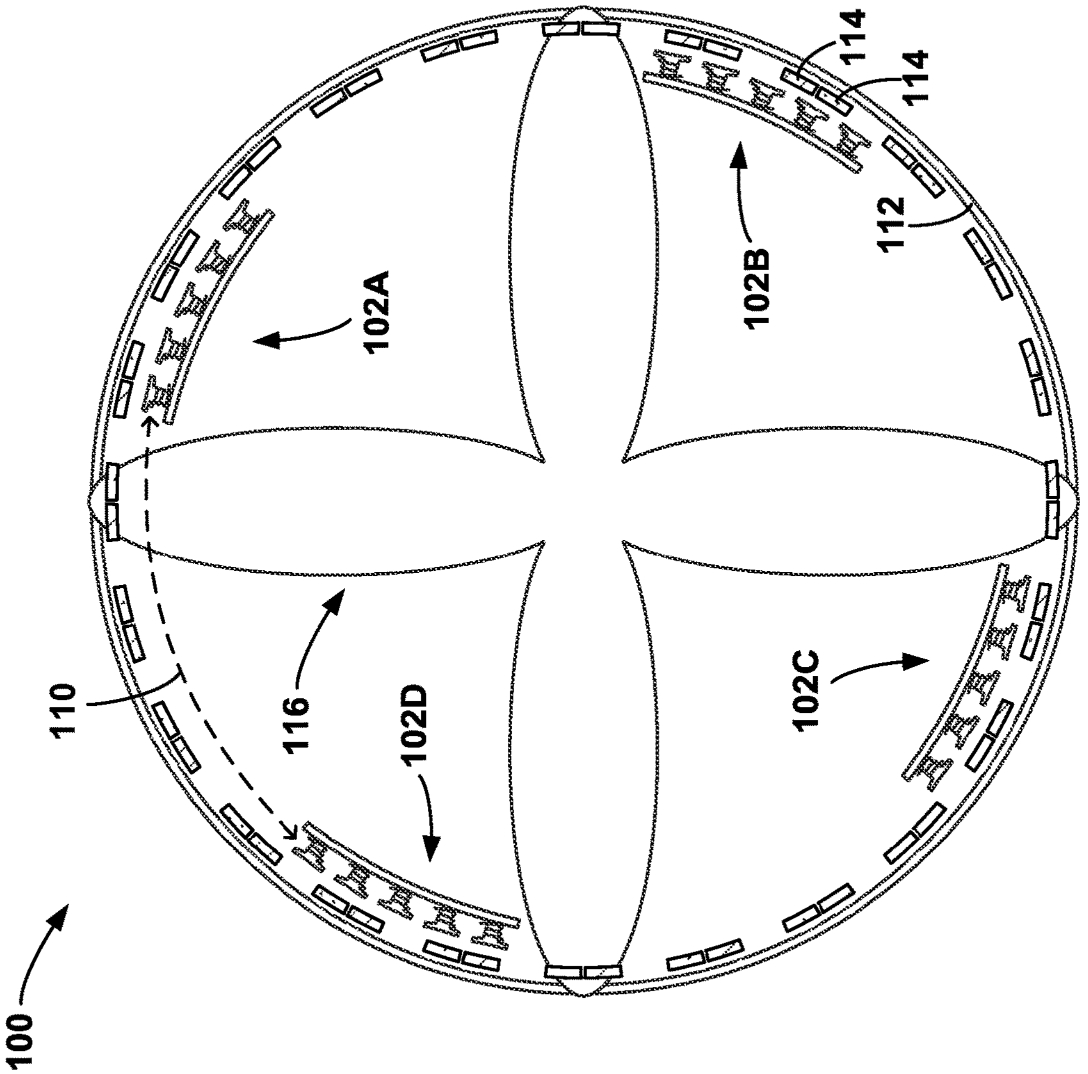
FIG. 6 is a schematic diagram of an electric propulsion system, according to an example.

FIG. 6 is a schematic diagram of another example of the electric propulsion system 100. In FIG. 6, the electric propulsion system 100 includes all of the structures and features of the electric propulsion systems 100 shown in FIG. 3, FIG. 4, and FIG. 5, unless context clearly dictates otherwise.

In FIG. 6, the electric propulsion system 100 is similar to that of FIG. 5, except that the radial positions of the stator segments 102A-D and the rotor frame 112 have been reversed. That is, the rotor frame 112 and the rotor magnets 114 are distal with respect to the stator segments 102A-D. In such an example, the propeller 116 can be attached to the rotor frame 112 to be axially offset with respect to the rotor frame 112 and the stator segments 102A-D such that the rotation of the propeller 116 moves air over the coils 106 of the stator segments 102A-D.

Figure 7:
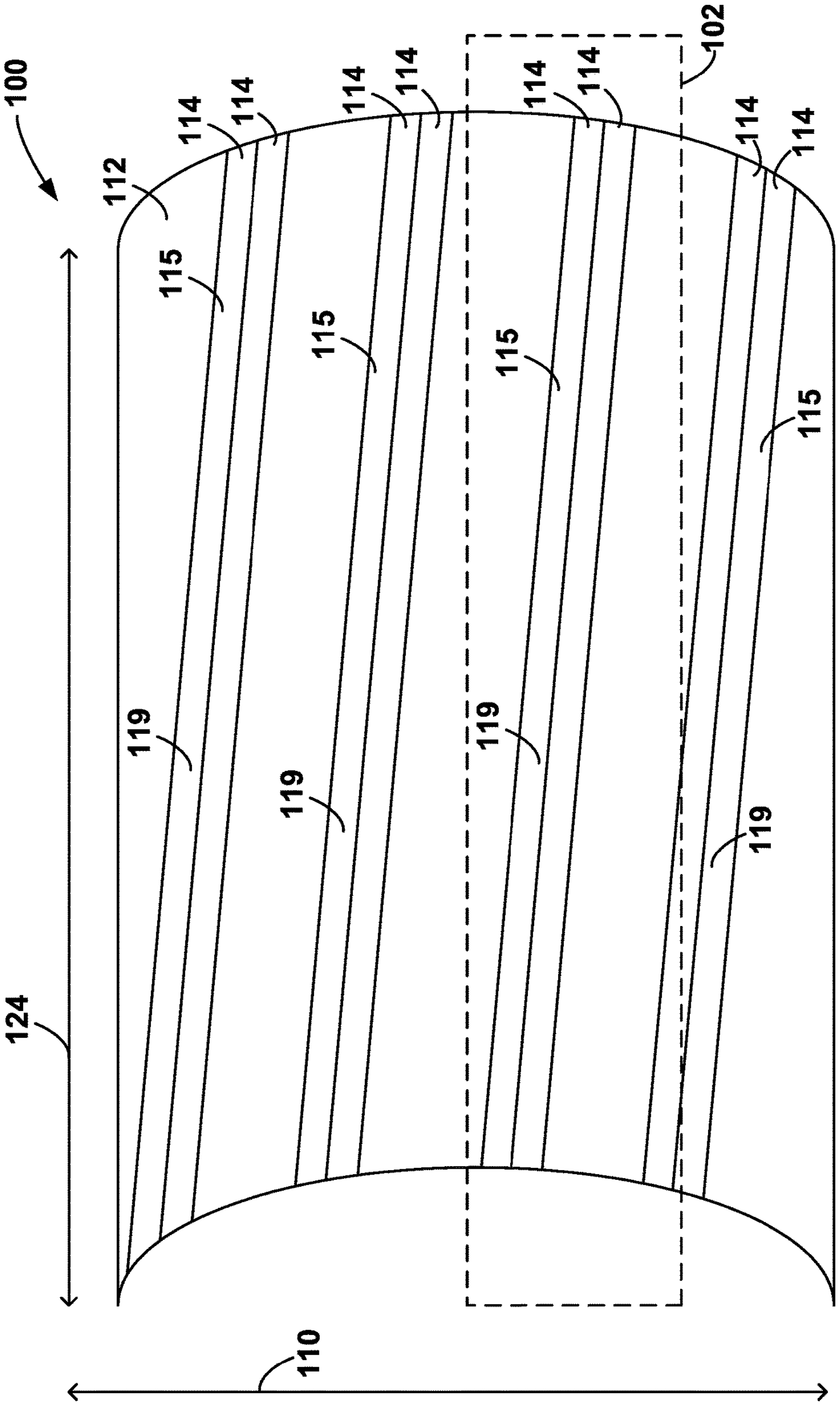
FIG. 7 is a schematic diagram of an electric propulsion system, according to an example.

FIG. 7 is a schematic diagram of a portion of the electric propulsion system 100. In FIG. 7, the electric propulsion system 100 includes all of the structures and features of the electric propulsion systems 100 shown in FIGS. 3-6, unless context clearly dictates otherwise.

As shown, the rotor magnets 114 are elongated in the azimuthal direction 110 transverse to an axial direction 124 of the electric propulsion system 100. More specifically, the rotor magnets 114 are elongated in a direction that has a component parallel to the axial direction 124 and a component parallel to the azimuthal direction 110.

As such, clockwise rotation of the rotor frame 112 causes first portions 115 of the rotor magnets 114 to pass the stator segment 102 and thereafter causes second portions 119 of the rotor magnets 114 that are at different axial positions than the first portions 115 to pass the stator segment 102.

Figure 8:
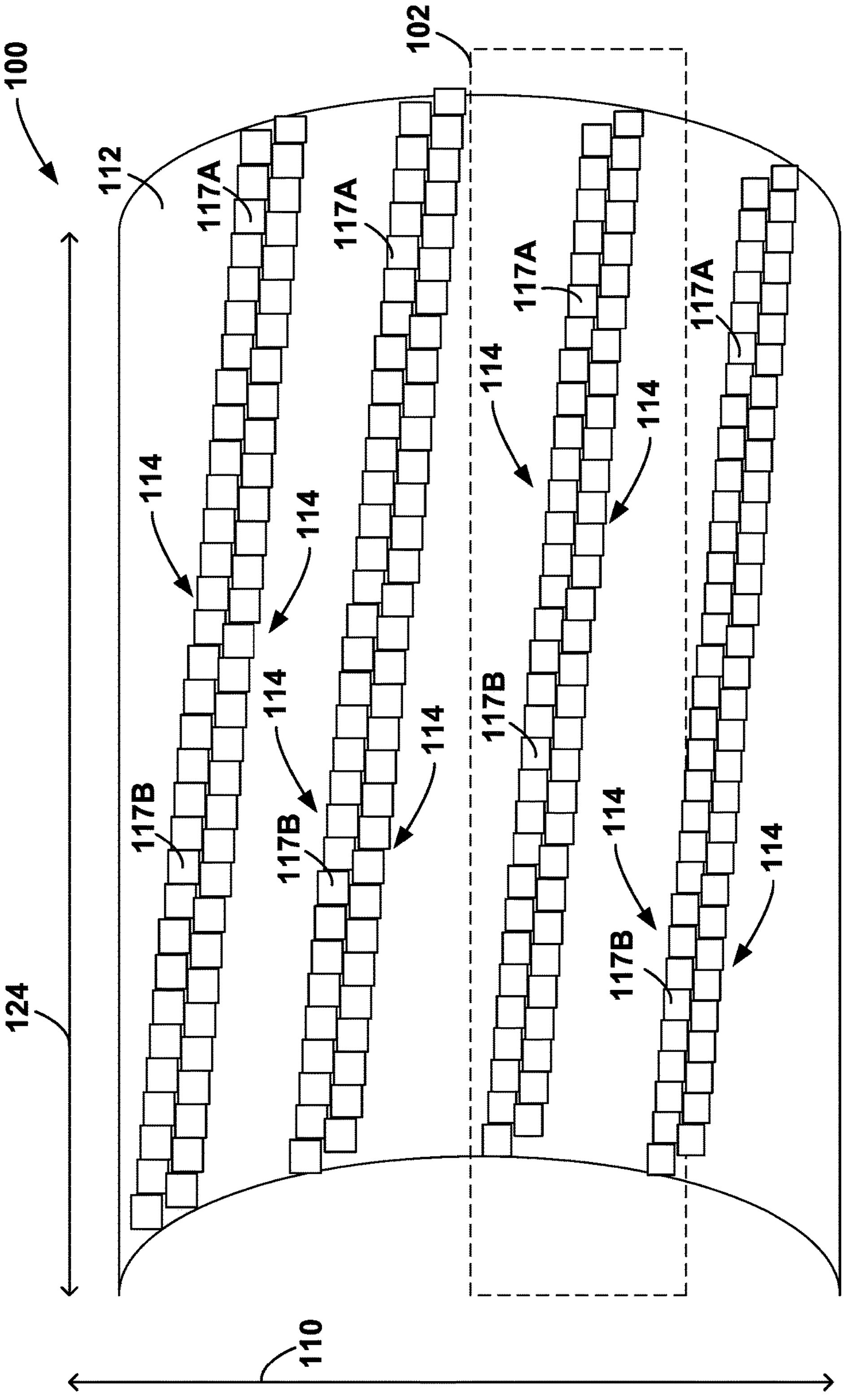
FIG. 8 is a schematic diagram of an electric propulsion system, according to an example.

FIG. 8 is a schematic diagram of a portion of the electric propulsion system 100. In FIG. 8, the electric propulsion system 100 includes all of the structures and features of the electric propulsion systems 100 shown in FIGS. 3-7, unless context clearly dictates otherwise.

As shown, each of the rotor magnets 114 include magnet segments 117 that are staggered in the azimuthal direction 110 moving along the axial direction 124 of the electric propulsion system 100.

As such, clockwise rotation of the rotor frame 112 causes the magnet segments 117A of the rotor magnets 114 to pass the stator segment 102 and thereafter causes the magnet segments 117B of the rotor magnets 114 that are at different axial positions than the magnet segments 117A to pass the stator segment 102.

Figure 9:
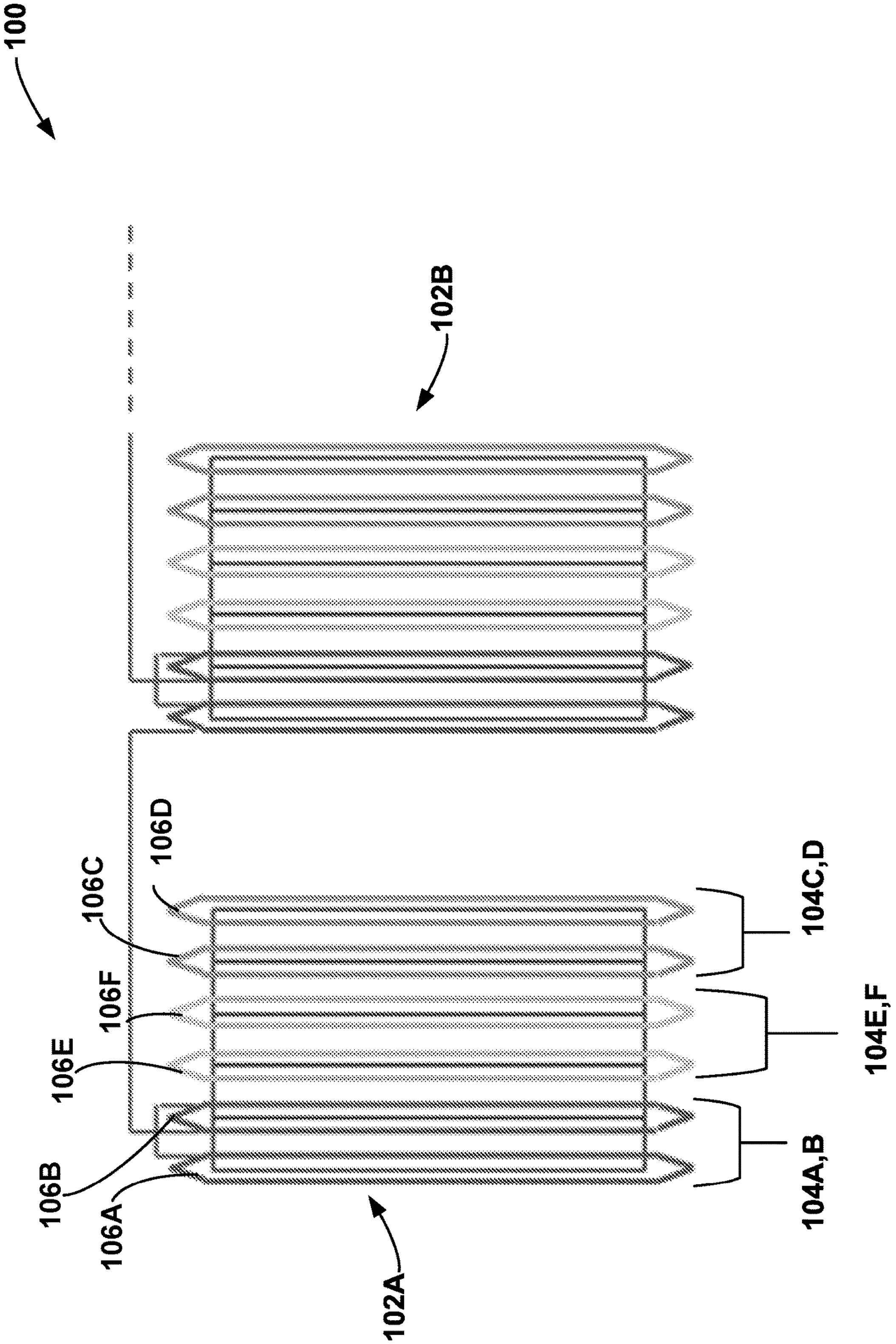
FIG. 9 is a schematic diagram of stator segments of an electric propulsion system, according to an example.

FIG. 9 is a schematic diagram of a stator segment 102A and a stator segment 102B of the electric propulsion system 100. The stator segment 102A includes a pair of teeth 104A and 104B, a pair of teeth 104C and 104D, and a pair of teeth 104E and 104F. The teeth 104E and 104F are immediately adjacent to and between the pair of teeth 104A and 104B and the pair of teeth 104C and 104D.

The stator segment 102A also includes a pair of coils 106A and 106B (e.g., a first phase winding) wrapped around the pair of teeth 104A and 104B, a pair of coils 106C and 106D (e.g., a second phase winding) wrapped around the pair of teeth 104C and 104D, and a pair of coils 106E and 106F (e.g., a third phase winding) wrapped around the third pair of teeth 104E and 104F.

The stator segment 102B includes the same components as the stator segment 102A, with the first phase winding of the stator segment 102B being wired in series with the first phase winding of the stator segment 102A, the second phase winding of the stator segment 102B being wired in series with the second phase winding of the stator segment 102A, and the third phase winding of the stator segment 102B being wired in series with the third phase winding of the stator segment 102A. The three phase windings are connected together at a neutral terminal.

Figure 10:
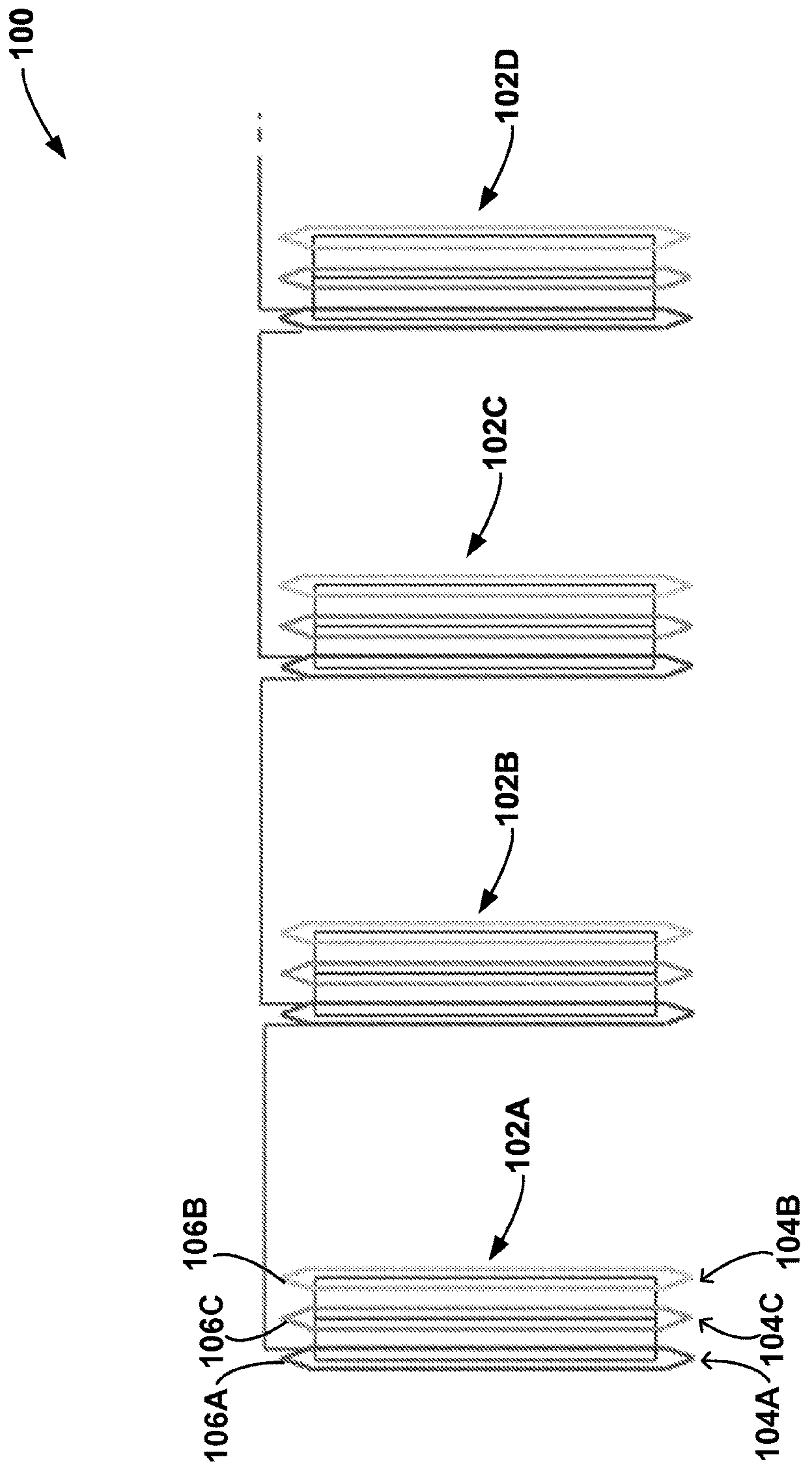
FIG. 10 is a schematic diagram of stator segments of an electric propulsion system, according to an example.

FIG. 10 is a schematic diagram of stator segments 102A-D of the electric propulsion system 100. The stator segment 102A includes a tooth 104A, a tooth 104B, and a tooth 104C that is immediately adjacent to and between the tooth 104A and the tooth 104B.

The stator segment 102A also includes a coil 106A (e.g., a first phase winding) wrapped around the tooth 104A, a coil 106B (e.g., a second phase winding) wrapped around the tooth 104B, and a coil 106C (e.g., a third phase winding) wrapped around the tooth 104C. The coils 106A-C are electrically connected to each other at a neutral terminal.

The stator segments 102B-D include the same components as the stator segment 102A, with the first phase winding of the stator segments 102B-D being wired in series with the first phase winding of the stator segment 102A, the second phase winding of the stator segments 102B-D being wired in series with the second phase winding of the stator segment 102A, and the third phase winding of the stator segments 102B-D being wired in series with the third phase winding of the stator segment 102A. The three phase windings are connected together at a neutral terminal.

Figure 11:
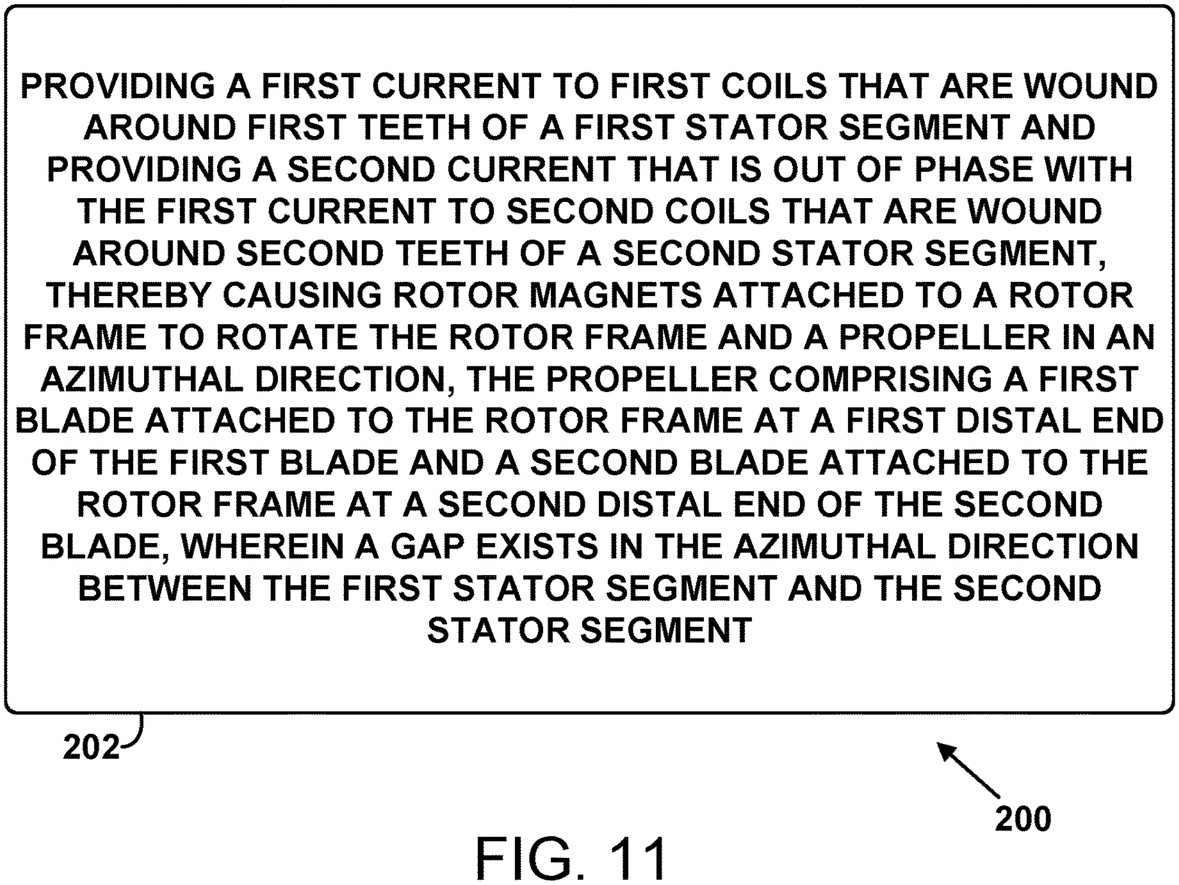
FIG. 11 is a block diagram of a method, according to an example.
Figure 12:
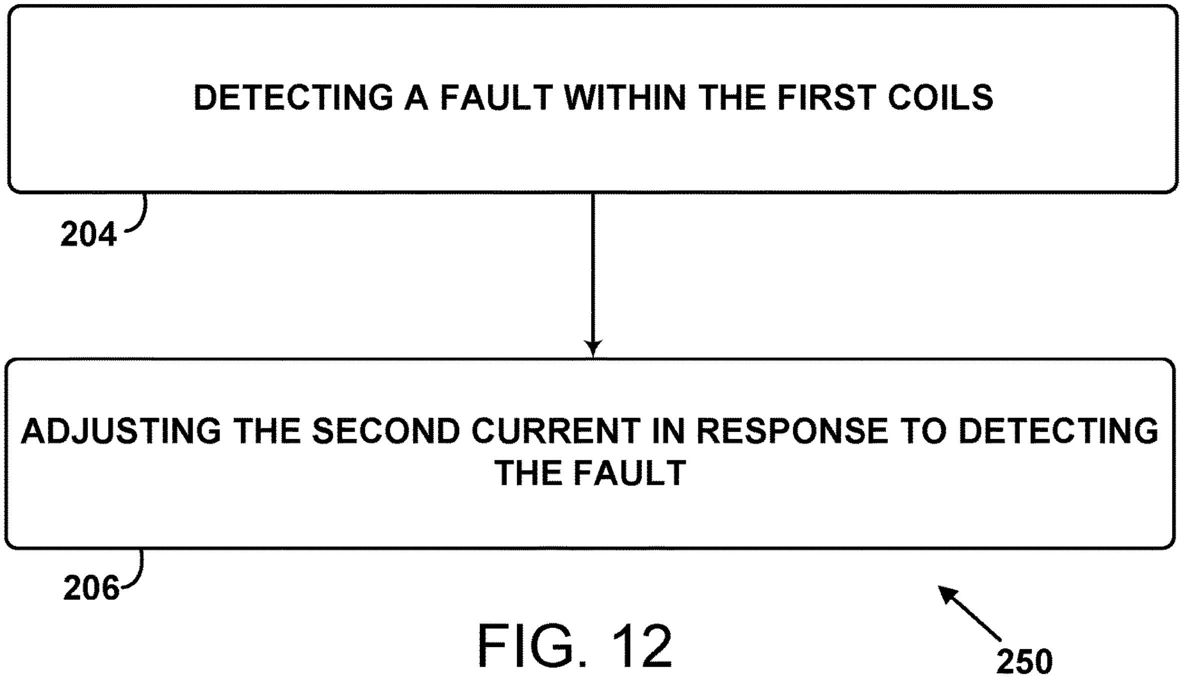
FIG. 12 is a block diagram of a method, according to an example.

FIG. 11 and FIG. 12 are block diagrams of a method 200 and a method 250 of operating the electric propulsion system 100. As shown in FIG. 11 and FIG. 12, the method 200 and the method 250 include one or more operations, functions, or actions as illustrated by blocks 202, 204, and 206. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

At block 202, the method 200 includes providing a first current to first coils that are wound around first teeth of a first stator segment 102A and providing a second current that is out of phase with the first current to second coils that are wound around second teeth of a second stator segment 102B, thereby causing the rotor magnets 114 attached to the rotor frame 112 to rotate the rotor frame 112 and the propeller 116 in the azimuthal direction 110. Functionality related to block 202 is described above with reference to FIGS. 3 and 4.

At block 204, the method 250 includes detecting a fault within the first coils.

At block 206, the method 250 includes adjusting the second current in response to detecting the fault. Functionality related to blocks 204 and 206 is described above with reference to FIGS. 3 and 4.

The description of the different advantageous arrangements has been presented for purposes of illustration and description, and is not intended to be exhaustive or limited to the examples in the form disclosed. Many modifications and variations will be apparent to those of ordinary skill in the art. Further, different advantageous examples may describe different advantages as compared to other advantageous examples. The example or examples selected are chosen and described in order to explain the principles of the examples, the practical application, and to enable others of ordinary skill in the art to understand the disclosure for various examples with various modifications as are suited to the particular use contemplated.

What is claimed is:

1. An electric propulsion system comprising:

a first stator segment comprising first teeth and first coils wound around the first teeth;

a second stator segment comprising second teeth and second coils wound around the second teeth, wherein a gap exists in an azimuthal direction between the first stator segment and the second stator segment;

a rotor frame;

rotor magnets attached to the rotor frame and configured to rotate the rotor frame in the azimuthal direction in response to the first coils or the second coils being provided current, the rotor magnets elongated along (i) a first direction component of an axial direction of the electric propulsion system and (ii) a second direction component of the azimuthal direction, wherein the individual rotor magnets longitudinally extend along a direction that is angled with respect to the axial direction of the electric propulsion system between a first longitudinal end of the rotor frame and a second longitudinal end of the rotor frame opposite the first longitudinal end, the individual rotor magnets extending between the first and second longitudinal ends as segments that are angled relative to the axial direction, the segments to longitudinally abut one another such that adjacent segments extend longitudinally parallel to eachother while being angled relative to the axial direction; and a propeller comprising a first blade attached to the rotor frame at a first distal end of the first blade and a second blade attached to the rotor frame at a second distal end of the second blade.

2. The electric propulsion system of claim 1, wherein the first stator segment and the second stator segment are coplanar.

3. The electric propulsion system of claim 1, wherein a first proximal end of the first blade is attached to a second proximal end of the second blade.

4. The electric propulsion system of claim 1, wherein the first coils are in series with one another and the second coils are in series with one another, and wherein the first coils are electrically connected to the second coils at a neutral terminal.

5. The electric propulsion system of claim 1, wherein the first teeth comprise:

a first pair of teeth;

a second pair of teeth; and a third pair of teeth that is adjacent to and between the first pair of teeth and the second pair of teeth, p1 wherein a first pair of coils of the first coils are wrapped around the first pair of teeth, a second pair of coils of the first coils are wrapped around the second pair of teeth, and a third pair of coils of the first coils are wrapped around the third pair of teeth.

6. The electric propulsion system of claim 1, wherein the first teeth comprise:

a first tooth;

a second tooth; and a third tooth that is adjacent to and between the first tooth and the second tooth, wherein the first coils comprise a first coil wrapped around the first tooth, a second coil wrapped around the second tooth, and a third coil wrapped around the third tooth, and wherein the first coil, the second coil, and the third coil are electrically connected to each other at a neutral terminal.

7. The electric propulsion system of claim 1, wherein the rotor frame is distal with respect to the first stator segment and the second stator segment.

8. The electric propulsion system of claim 7, wherein the propeller is axially offset with respect to the rotor frame.

9. The electric propulsion system of claim 1, wherein the rotor frame is proximal with respect to the first stator segment and the second stator segment.

10. The electric propulsion system of claim 1, wherein the rotor magnets exhibit a rectangular shape.

11. The electric propulsion system of claim 1, wherein at least one of the individual rotor magnets extends between an entirety of the first and second longitudinal ends of the rotor frame.

12. The electric propulsion system of claim 1, wherein a first colinear group of the rotor magnets is separated by a distance from a second colinear group of rotor magnets.

13. The electric propulsion system of claim 12, wherein the distance between the first and second colinear groups remains the same between the first and second longitudinal ends of the rotor frame.

14. The electric propulsion system of claim 1, wherein the individual rotor magnets extend along a spiral direction between the first and second longitudinal ends of the rotor frame.

15. A method of operating an electric propulsion system, the method comprising:

providing a first current to first coils that are wound around first teeth of a first stator segment and providing a second current that is out of phase with the first current to second coils that are wound around second teeth of a second stator segment, thereby causing rotor magnets attached to a rotor frame to rotate the rotor frame and a propeller in an azimuthal direction, the propeller comprising a first blade attached to the rotor frame at a first distal end of the first blade and a second blade attached to the rotor frame at a second distal end of the second blade, wherein a gap exists in the azimuthal direction between the first stator segment and the second stator segment, and wherein the individual rotor magnets longitudinally extend along a direction that is angled with respect to an axial direction of the electric propulsion between a first longitudinal end of the rotor frame and a second longitudinal end of the rotor frame opposite the first longitudinal end, the individual rotor magnets extending between the first and second longitudinal ends as segments that are angled relative to the axial direction, the segments to longitudinally abut one eachother such that adjacent segments extend longitudinally parallel to another while being angled relative to the axial direction.

16. The method of claim 15, further comprising:

detecting a fault within the first coils; and adjusting the second current in response to detecting the fault.

17. The method of claim 16, wherein detecting the fault comprises detecting an open circuit within the first coils, and wherein adjusting the second current comprises increasing the second current.

18. The method of claim 15, wherein causing the rotor magnets to rotate the rotor frame comprises:

causing first portions of the rotor magnets to pass the first stator segment; and thereafter causing second portions of the rotor magnets that are at different axial positions than the first portions to pass the first stator segment.

19. The method of claim 15, wherein each of the rotor magnets comprises magnet segments that are staggered in the azimuthal direction moving along the axial direction of the electric propulsion system, and wherein causing the rotor magnets to rotate the rotor frame comprises:

causing first magnet segments of the rotor magnets to pass the first stator segment; and thereafter causing second magnet segments of the rotor magnets that are at different axial positions than the first magnet segments to pass the first stator segment.

20. The method of claim 15, wherein causing the rotor magnets to rotate the propeller comprises moving air over the first coils and the second coils.

21. An aircraft comprising:

a body; and an electric propulsion system configured to propel the body, the electric propulsion system comprising:

a first stator segment comprising first teeth and first coils wound around the first teeth;

a second stator segment comprising second teeth and second coils wound around the second teeth, wherein a gap exists in an azimuthal direction between the first stator segment and the second stator segment;

a rotor frame;

rotor magnets attached to the rotor frame and configured to rotate the rotor frame in the azimuthal direction in response to the first coils or the second coils being provided current, wherein the individual rotor magnets are angled with respect to an axial direction of the electric propulsion system such that the rotor magnets longitudinally extend at different angles relative to the axial direction between a first longitudinal end of the rotor frame and a second longitudinal end of the rotor frame opposite the first longitudinal end, the individual rotor magnets extending between the first and second longitudinal ends as segments that are angled relative to the axial direction, the segments to longitudinally abut one another such that adjacent segments extend longitudinally parallel to eachother while being angled relative to the axial direction; and a propeller comprising a first blade attached to the rotor frame at a first distal end of the first blade and a second blade attached to the rotor frame at a second distal end of the second blade.

* * * * *